United States Patent [19]

Herzog et al.

[11] Patent Number: 5,144,854
[45] Date of Patent: Sep. 8, 1992

[54] TRANSMISSION SHIFT CONTROL REVERSE INHIBITOR APPARATUS

[75] Inventors: David K. Herzog, Sterling Heights; Willem S. Haven, Waterford; Frederick B. Hummer; Syed T. Razzacki, both of Troy, all of Mich.

[73] Assignee: Chrysler Corporation, Highland Park, Mich.

[21] Appl. No.: 666,777

[22] Filed: Mar. 8, 1991

[51] Int. Cl.⁵ .................. F16H 61/06; F16H 1/12
[52] U.S. Cl. ............................. 74/476; 74/501.6
[58] Field of Search ........... 74/475, 476, 500.5, 74/501.6

[56] References Cited

U.S. PATENT DOCUMENTS

| | | | |
|---|---|---|---|
| 3,866,488 | 2/1975 | Nakata et al. | 74/476 X |
| 3,933,057 | 1/1976 | Tsuzuki et al. | 74/476 |
| 3,939,724 | 2/1976 | Takahashi et al. | 74/476 |
| 4,143,560 | 3/1979 | Kinkade et al. | 74/476 X |
| 4,174,644 | 11/1979 | Nagy et al. | 74/475 X |
| 4,275,614 | 6/1981 | Okubo et al. | 74/476 |
| 4,324,150 | 4/1982 | Kawamoto | 74/476 |

Primary Examiner—Allan D. Herrmann
Assistant Examiner—David W. Laub
Attorney, Agent, or Firm—Edward P. Barthel

[57] ABSTRACT

In a shift control arrangement for a manual transmission wherein dual cables lead from a floor-mounted shift control lever to dual select and shift shafts operatively connected to the transmission, a shift mechanism bearing a shift finger is rotatably and slidably mounted on a shaft in the housing, such that, through suitable linkage, the shift finger is selectively rotated by the select shaft into ½, ¾, or 5/R shift positions, and then slid by the shift shaft into the 1, 3 or 5 shift ratios in one direction, or the 2, 4 or R shift ratios in the other direction. A reverse inhibitor mechanism operates in conjunction with a pin extending from the rotatable and slidable shift mechanism to prevent an inadvertent manual shift from 5 to R ratio positon, and to result in a shift from 5 to 4 instead.

5 Claims, 7 Drawing Sheets

TRANSMISSION SHIFT CONTROL REVERSE INHIBITOR APPARATUS

TECHNICAL FIELD

This invention relates generally to automotive transmission shift control apparatus and, more particularly, to a manual transmission shift control apparatus including a reverse inhibitor mechanism to prevent an inadvertent shift from FIFTH to REVERSE ratio position.

BACKGROUND ART

Heretofore, it has been recognized as desirable to provide reverse inhibitor arrangements for manual gearshift mechanism.

Many of these arrangements have included lock-out means or stop members associated with the lower end of the control lever actuated by the operator inside the vehicle, such as disclosed U.S. Pat. Nos. 4,693,135; 4,143,560; 4,324,150; 4,275,614; 3,866,488; and 3,933,057.

When a shift pattern is such that the highest ratio, e.g., FIFTH, shift rail lug in the transmission is positioned directly opposite the reverse ratio shift rail lug, other means associated with the shift mechanism on the top of the transmission are employed. For example, in Gorman et al patent No. 4,638,678, an inhibitor lever having two abutment pads and being slidably and rotatably disposed on a support rod, in conjunction with a spring mounted around the support rod, is contacted and pivoted by the selector lever against the spring until one of the two abutment pads contacts the housing to prevent further pivoting of the selector lever toward REVERSE ratio position prior to linear movement toward a lower forward ratio position.

Nagy et al U.S. Pat. No. 4,174,644 includes an interlock member formed of sheet metal, with a central rectangular portion and opposite walls located on opposite sides of a shift lever, and being apertured to receive the shift shaft so that the interlock member moves with the shift shaft during its axial movement and is held against rotary movement by an axial guide on the housing, inhibiting selecting movement to reverse position.

Ida et al U.S. Pat. No. 4,476,740 discloses a safety device for preventing direct movement of the gearshift lever into the reverse ratio position R from the oppositely disposed fifth speed ratio position 5 across the same gate. The safety device includes a radial projection integral with a selector sleeve member, a reverse restrict pin with a radial abutment surface formed thereon and being mounted in a boss portion, and a coil spring assembled with the restrict pin, such that rotary movement of the restrict pin is restricted by engagement of the radial projection with the radial abutment surface to prevent an error in shifting operation of the gearshift lever toward the reverse-ratio position R. Kudo et al U.S. Pat. No. 4,381,682 provides a latch member for preventing inadvertent shifting into reverse drive condition from a forward drive condition. The latch member includes a lock claw which is positioned in one position in the path of movement of a fork shift member projection to restrict movement of the fork shift member and inhibit engagement of the reverse drive gear. Cooperating cam surfaces of the latch member and fork shift member serve to return the latch member to the other of its positions upon return of the shift fork member to an intermediate neutral position.

DISCLOSURE OF THE INVENTION

A general object of the invention is to provide an improved reverse inhibitor assembly in a transmission shift control mechanism.

Another object of the invention is to provide such an improved reverse inhibitor mechanism which operates in conjunction with a rotatable and slidable shift mechanism to cause the latter to prevent the actuation of the REVERSE shift rail lug when shifting from FIFTH gear ratio position, rather, causing the shift mechanism to veer toward FOURTH position.

A further object of the invention is to provide a reverse inhibitor mechanism in a shift control mechanism. A pin mounted on a side of a rotatable and slidable shift mechanism contacts a spring loaded cam arm on a movable part of the reverse inhibitor mechanism, causing the latter to pivot until a straight arm of the movable part, oppositely disposed from the cam arm, to contact a fixed portion of the reverse inhibitor mechanism, to thereby force the pin downwardly to redirect a shift finger on the shift mechanism away from the REVERSE shift rail lug toward a FOURTH shift rail lug, as the shift mechanism continues sliding.

These and other objects and advantages will be more apparent when reference is made to the following drawings and accompanying description.

BRIEF DESCRIPTION OF THE DRAWINGS

FIG. 5 is a cross-sectional view taken along the plane of the line 5—5 of FIG. 4, and looking in the direction of the arrows;

FIG. 6 is a cross-sectional view taken along the plane of the line 6—6 of FIG. 56, and looking in the direction of the arrows;

FIG. 6A an 6B are respective side views taken along the planes of the lines 6A—6A and 6B—6B of FIG. 6, and looking in the direction of the arrows;

BEST MODE OF CARRYING OUT THE INVENTION

Figure 1:
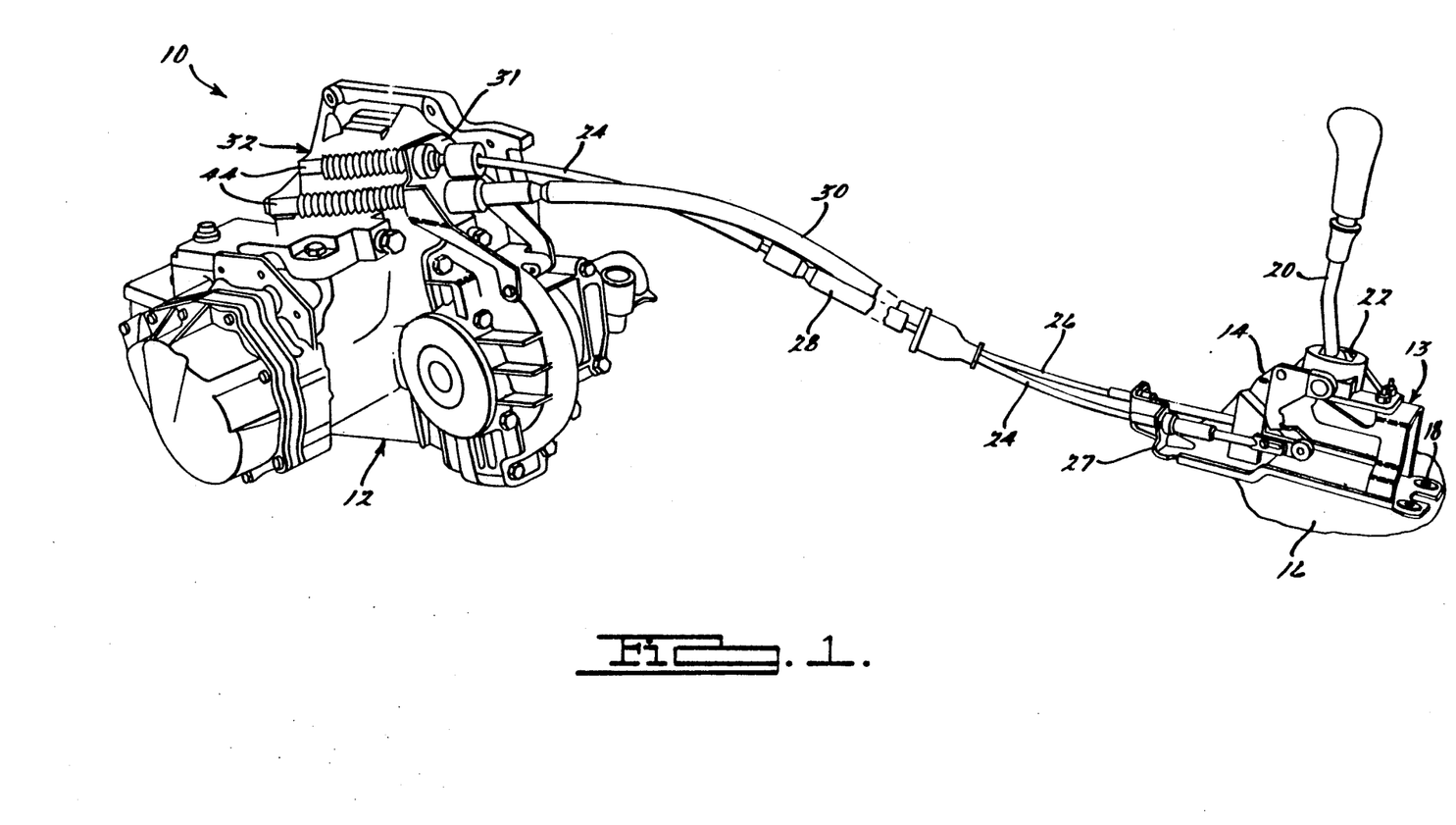
FIG. 1 is a perspective view of the master or driving and slave or driven components of a transmission shift control apparatus interconnected by a pair of flexible cables.

Referring now to the drawings in greater detail, FIG. 1 illustrates a five-speed and reverse manual shift control apparatus 10 for an automotive transmission 12. The shift control arrangement 10 includes a shifter assembly 13 having a stamped housing 14 adapted to being secured to the floor 16 by suitable fasteners 18, a control lever 20 extending through an opening 22 formed in the top of the housing 14, a flexible select push-pull cable 24 and a flexible shift push-pull cable 26 operatively connected to the lower end of the control lever 20 in the usual manner (not shown) and extending therefrom through the firewall 27 and within respective protective outer sheaves 28 and 30 through a support bracket 31 to a shift mechanism 32 operatively mounted on the top of the transmission 12.

The shift mechanism 32 includes a cover member 34 (FIGS. 2 and 3) having two vertical select and shift shafts 36 and 38, respectively, rotatably mounted through the cover, with a straight lever arm 40 and an arcuate-shaped lever arm 42 each secured at one end thereof to the extended ends of the respective shafts 36 and 38. The ends of the cables 24 and 26 include suitable connectors 44 adapted to being pivotally mounted on mounting pins 46 secured to the distal ends of the respective lever arms 40 and 42. It may be noted from FIGS. 1 and 2 that the cables 24 and 26 extend substantially along straight paths from the shifter assembly 13 to the respective mounting pins 46.

Figures 4, 7:
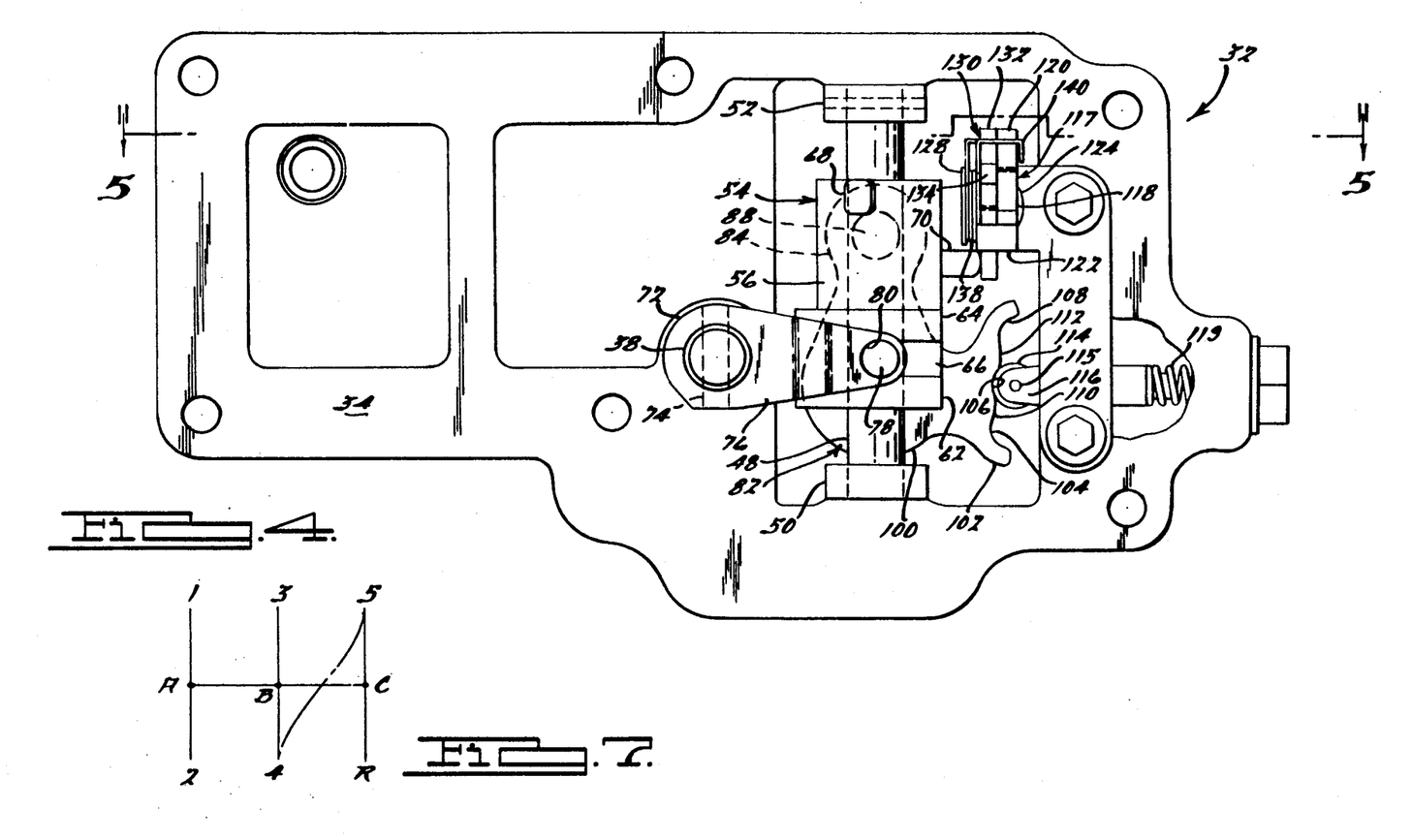
FIG. 4 is a bottom view of the driven portion of the FIG. 1 structure.
FIG. 7 is a diagrammatic view showing operational characteristics of the invention.
Figures 5, 6, 6A, 6B:
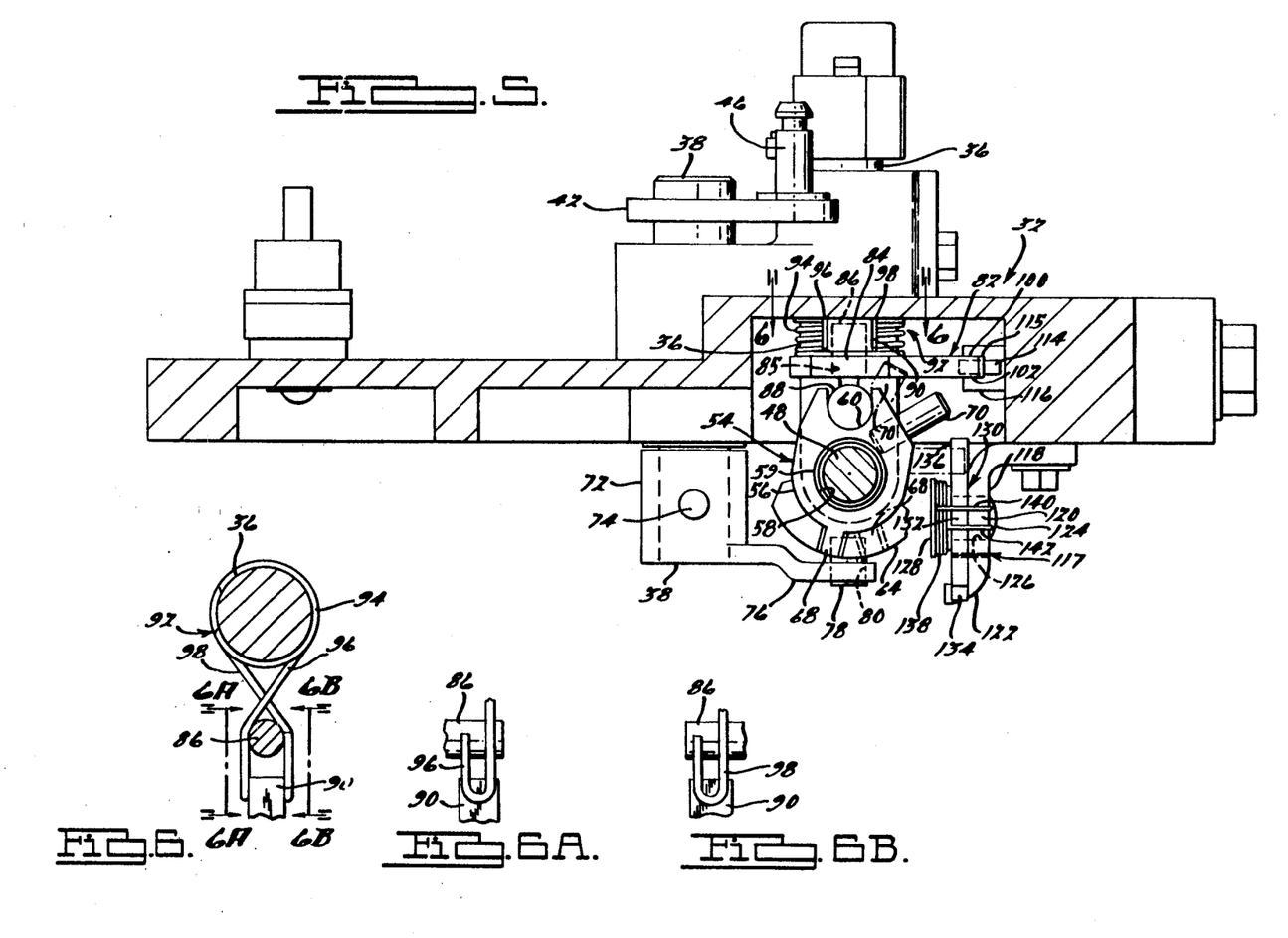

Referring now to FIGS. 4 and 5, the inside of the cover member 34 is shown to include a fixed circular sectioned rod 48 extending laterally across the cover member with the oppositely disposed ends thereof secured in mounting flanges 50 and 52. A selector mechanism 54 includes a substantially cylindrical spindle member 56 having a central opening 58 formed therethrough, having suitable bushing means 59 mounted therein adaptable to slidably and rotationally mounting the selector mechanism on the rod 48. A U-shaped trough 60 is formed the full length of the upper side of the member, with its axis parallel to the axis of the central opening 58. A pair of spaced-apart arcuate-shaped flanges 62 and 64, having peripheral surfaces concentric with the spindle member 56, are formed adjacent one end of the underside of the member 56 forming a slot 66 therebetween. An axially extending, four-sided finger 68 is formed adjacent the other end of the underside of the spindle member 56. A round pin 70 is formed to extend at a predetermined angle from a side of the member 56 at a longitudinal location intermediate the planes of the finger 68 and the slot 66. The axis of the pin 70 intersects a line connecting the axes of the trough 60 and the central opening 58 at a point closer to the latter.

A sleeve-like member 72 is secured around the inner end of the rotatably mounted shift shaft 38 by a press-fitted pin 74. A stepped lever arm 76 extends from the inner end portion of the sleeve-like member 72, with a follower pin 78 secured in an opening 80 formed adjacent the distal end of the arm 76 and extending into the slot 66 between the flanges 62 and 64.

A plate member 82 is secured to the inner end of the rotatably mounted shift selector shaft 36 adjacent the U-shaped trough 60. The plate member 82 includes a first arm portion 84 extending in a direction substantially along the length of the trough 60, and has an opening 85 formed adjacent the distal end thereof. A round spring actuator member 86 is press-fitted in the opening 84 so as to extend upwardly therefrom. A ball-shaped member 88 extends downwardly from the member 86 into the U-shaped trough 60, adapted to at times rotate the selector mechanism 54 through a predetermined arc and at times to slide in the trough 60 when the selector mechanism 54 is slid along the rod 48, for a purpose to be explained.

A fixed abutment 90 is formed to extend from an inner wall of the cover member 34 to a point in close proximity to the spring actuator member 86. A contoured torsion spring 92 is formed so as to have a round center portion 94 mounted around the select shaft 36, intermediate the plate member 82 and the inner surface of the cover member 34. The spring 92 further includes a pair of legs 96 and 98 extending from the center portion 94 and crossing each other intermediate the select shaft 36 and the spring actuator member 86, to straddle the latter (FIGS. 5 and 6) and extend to the oppositely disposed sides of the fixed abutment 90. The force of the spring 92 is such that the legs 96 and 98 tend to spring outwardly from each other and, by virtue of their crossover, are urged into a tight grip against the respective sides of the fixed abutment 90.

The plate member 82 further includes a second arm portion 100 extending substantially at a right angle with respect to the first arm portion 84, in a direction away from the select shaft 36. A flared portion 102 is formed on the distal end of the second arm portion 100 with a wave-like edge surface having three recesses 104, 106 and 108 formed thereon. The rounded protrusion 112 between the recesses 106 and 108 is slightly higher than the rounded protrusion 110 between the recesses 104 and 106, for a purpose to be described.

A spring-loaded roller detent 114 is rotatably mounted on a pin 115 supported by a hollow spring-loaded plunger 116 having a coil spring 119 mounted therein. The plunger 116 and coil spring 119 are mounted in a wall of the cover member 34, urging the roller detent 114 into contact with the surfaces of the elements 104, 110, 106, 112 and 108 so as to ride therealong upon rotation of the select shaft 36. The action of the torsion spring legs 96 and 98 against the fixed abutment 90 causes the roller detent 114 to seat against the center recess 106 when the select shaft 36 and the associated plate member 82 are at rest. For later operational identification, the plane through the recess 104 defines the ¼ position, the plane through the recess 106 defines the ⅜ position, and the plane through the recess 108 defines the 5/R position, representing the five manual shifts and reverse of the transmission 12.

A reverse inhibitor assembly 117 is mounted within the cover member 34 and extends downwardly therefrom. The assembly 117 includes a mounting bracket 118 having a straight fixed arm 120 extending laterally therefrom in a direction away from the flared portion 102, and a bent fixed arm 122 extending downwardly therefrom and bent toward the selector mechanism 54. A fixed rivet 124 is mounted through an opening 126 formed in the mounting bracket 118, with a spring retainer flange 128 formed on the inner end thereof. A reverse inhibitor lever 130 is pivotally mounted around the fixed rivet 124 against the mounting bracket 118, and includes radially extending, straight-sided arms 132 and 134, and a generally triangular-shaped cam arm 136 with a rounded apex 137 formed substantially directly opposite the arm 134. A torsion spring 138 is mounted around the fixed rivet 124 intermediate the reverse inhibitor lever 130 and the flange 128, with legs 140 and 142 extending therefrom and bent so as to normally confine the arms 132 and 120 therebetween in side-by-side alignment. In this position, the arm 134 extends downwardly in a location intermediate the straight fixed arm 120 and the bent fixed arm 122.

OPERATION

Generally, movement of the shift control lever 20 laterally rotates the select shaft 36 and the associated transmission 12 into one of three FIRST/SECOND, THIRD/FOURTH, and FIFTH/REVERSE selector positions, comparable to points A, B and C of the FIG. 7 shift pattern, and movement of the shift control lever 20 longitudinally rotates the shift shaft 38 in one direction into FIRST (1), THIRD (3) or FIFTH (5), or in the opposite direction into SECOND (2), FOURTH (4) or REVERSE (R) selected shift positions, in manners to be explained.

Inasmuch as the shift shaft 38 is rotatable only, cable angularity resulting from sliding action is eliminated. Being rotatable, rather than slidable, also results in lower seal drag and eliminates the need for an external shaft cover or boot.

Figure 2:
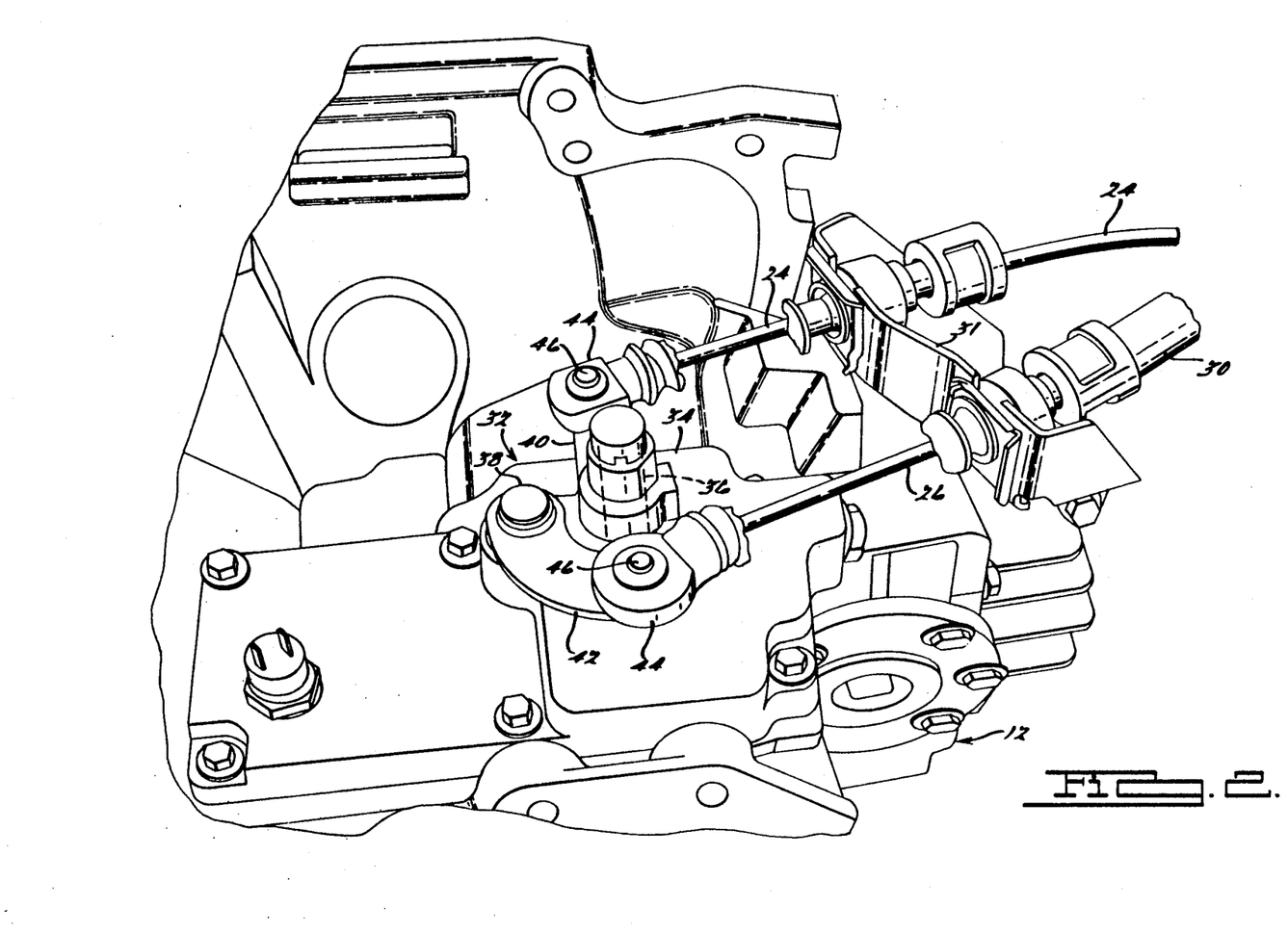
FIG. 2 is an enlarged fragmentary perspective view of a portion of the FIG. 1 structure.
Figure 3:
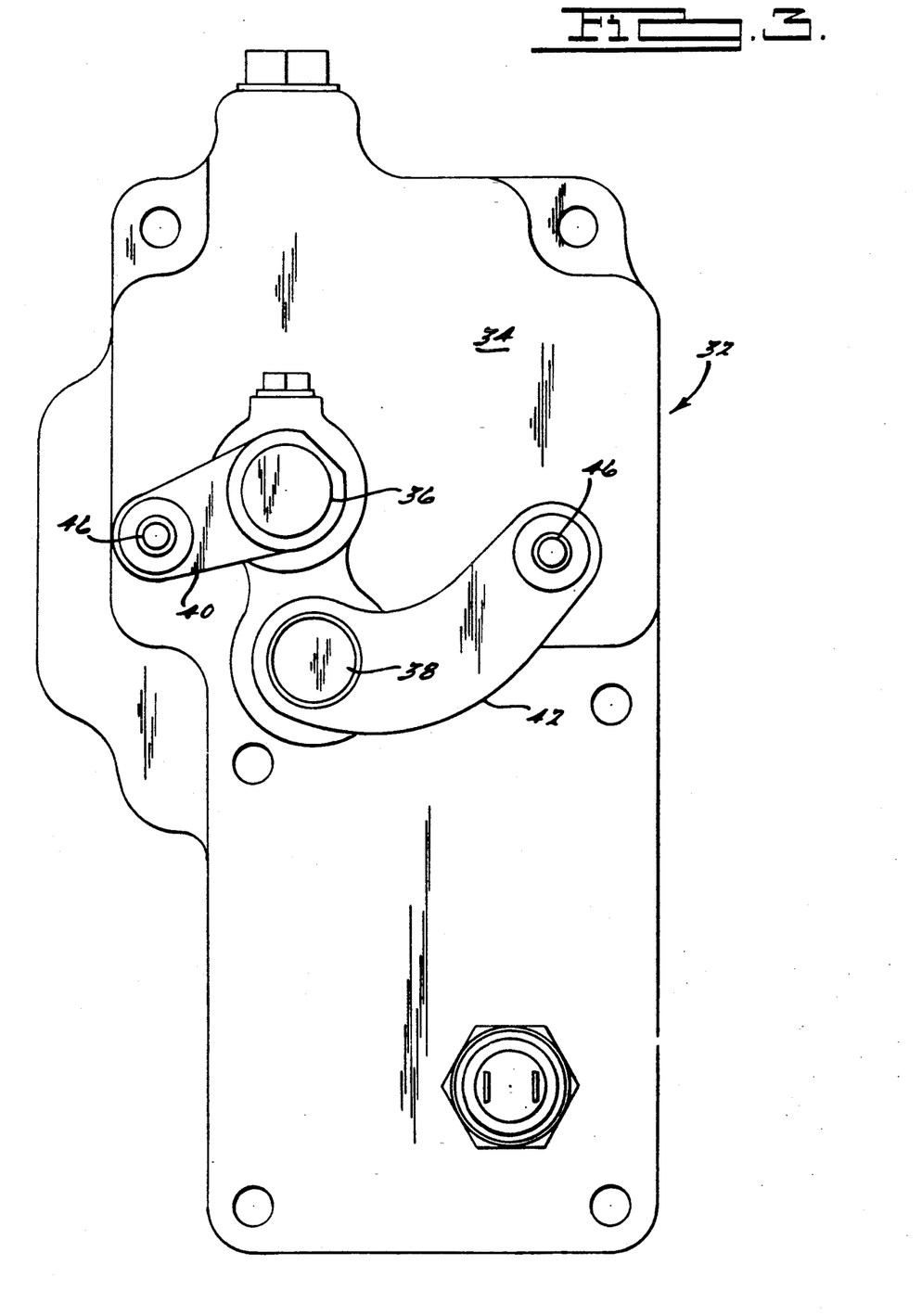
FIG. 3 is a plan view of components of the FIG. 2 structure.

When the select shaft 36 is rotated in a clockwise direction in FIGS. 2 and 6 via the select cable 24, responding to the manual movement of the control lever 20, the flared portion 102 of the plate member 82 is pivoted in a counterclockwise direction, bringing the ½ recess 104 into contact with the spring-loaded roller detent 114 and, simultaneously, moving the spring actuator member 86 against the force of the spring leg 96 and the ball-shaped member 88 in the trough 60 such that the selector mechanism 54 is rotated about the rod 48 in a counterclockwise direction in FIG. 5. This positions the finger 68 such that rotation of the shift shaft 38 moves the selector mechanism 54 via the lever arm 76, and, hence, the finger 68 along the rod 48 to selectively actuate oppositely disposed shift rail lugs 144 (FIG. 11) of the transmission 12 into either FIRST or SECOND ratio positions.

Figure 8:
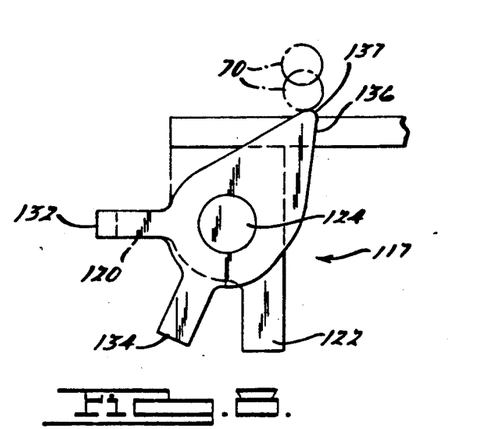
FIGS. 8, 9 and 10 are operational views of a subassembly of the shift control apparatus.

Movement of the shift control lever 20 laterally to the ¾ position rotates the select shaft 36 and the associated flared end 102 so as to position the center recess 106 against the spring-actuated roller 114, causing the ball-like member 88 to position the selector mechanism 54 such that the finger 68 is positioned between a second pair of the rail lugs 144. Inasmuch as the protrusion 112 is higher than the protrusion 110, there results a higher selector load from the ¾ position to the 5/R position than from the ¾ position to the ½ position, thereby reducing the likelihood of an inadvertent 2 to 5 shift. Movement of the shift control lever 20 longitudinally in one direction or the other rotates the shift shaft 38 and the associated lever arm 76 to slide the selector mechanism 54 along the rod 48 to cause the finger 68 to move the selected rail lug of the transmission 12 into either THIRD or FOURTH ratio position. As such, the reverse inhibitor assembly 117 remains in the ¾ neutral position shown in FIG. 8.

Movement of the shift control lever 20 laterally to the 5/R position attains the engagement of the recess 108 and the roller 114 and rotation of the selector mechanism 54 via the ball-like member 88 such that, as a result of the longitudinal movement of the shift control lever 20 and the resultant rotation of the shift shaft 38 and the lever arm 76, the finger 68 can now be slid along the rod 48 moving the finger 68 and the selected rail lug into one of the FIFTH or REVERSE ratio positions. As the pin member 70 passes the reverse inhibitor assembly 117, the respective arms are as shown in FIG. 9.

Figure 10:
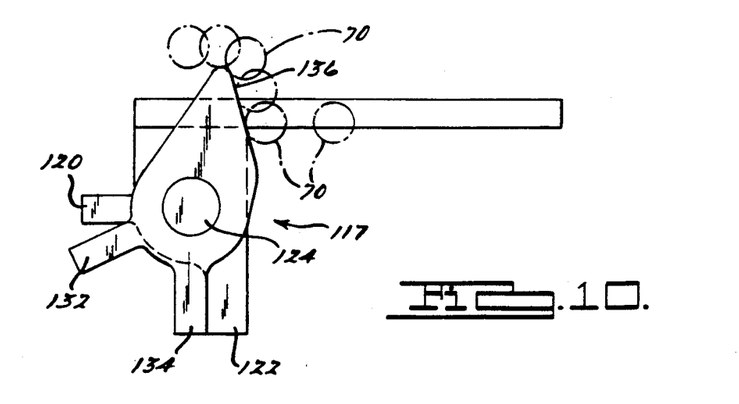

It should be noted at this point that, when FIFTH gear is selected, the arm 134 is released from a position adjacent the spring arm 142, permitting the spring arm 140 to urge the finger 132 into a position aligned with the fixed arm 120. This causes the arm 134 to move into a position intermediate the arm 120 and the bent end arm 122, and the triangular cam arm 136 into an upwardly extending orientation. In the latter position, the cam arm 136 will interfere with the pin 70 of the selector mechanism 54 if the driver were to pull straight back on the shift control lever 20 in the process of down shifting from FIFTH, blocking any inadvertent selection of REVERSE. In this event, when the pin 70 contacts the cam arm 136, it will first cause the arm 134 to rotate into abutting engagement with the bent end portion of the fixed bent arm 122, as shown in FIG. 10, in turn, causing, via the ball-like member 88 and the action of the torsion spring 92, the flared end 102 to pivot from the 5/R position into the ¾ position. Further pressure on the shift control lever 20 causes the finger 68 of selector mechanism 54 to engage the FOURTH gear, as illustrated by the phantom line shown in FIG. 7, with the pin 70 tracking as shown in FIG. 10.

Figure 11:
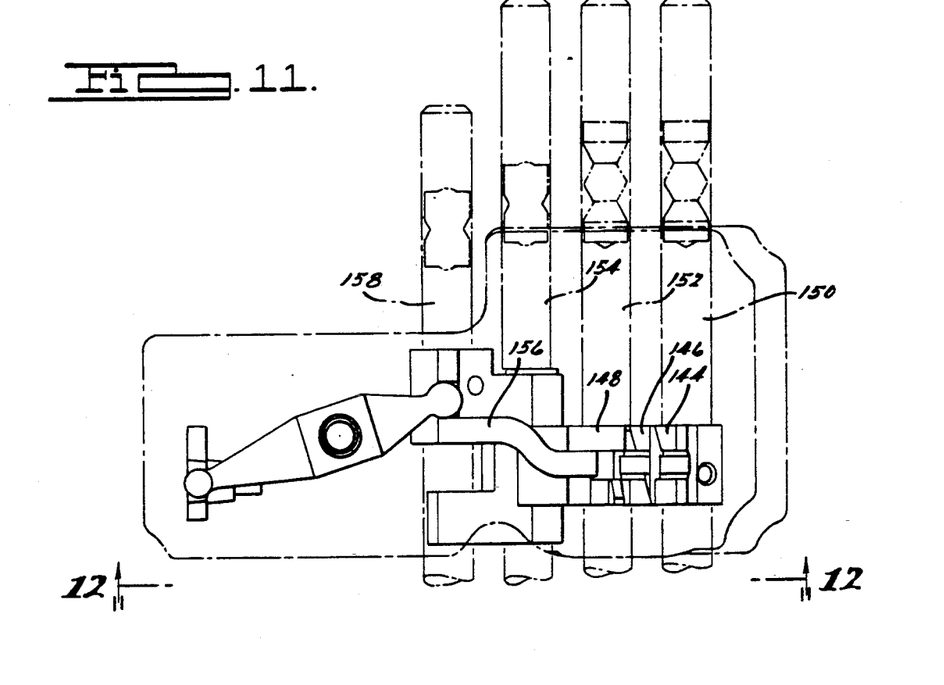
FIG. 11 is a view of the internal transmission components actuated by the FIGS. 1-6 arrangement.
Figure 12:
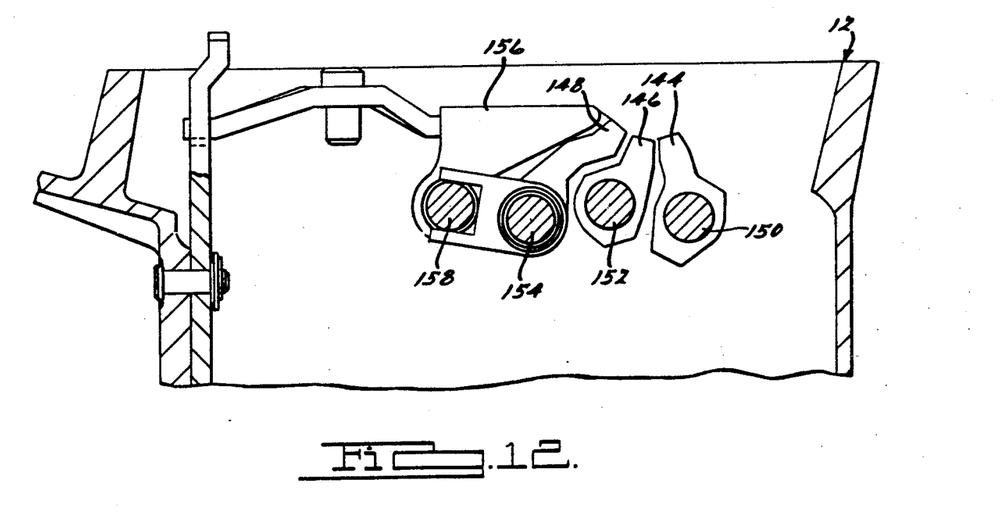
FIG. 12 is a fragmentary cross-sectional view taken along the plane of the line 12—12 of FIG. 11, and looking in the direction of the arrows.

As shown in FIGS. 11 and 12, shift rail lug members 144, 146 and 148 serve to actuate respective shift rails 150 for FIRST/SECOND, 152 for THIRD/FOURTH, and 154 for FIFTH, and an elongated lug member 156 serves to actuate the REVERSE rail 158.

Figures 9, 13:
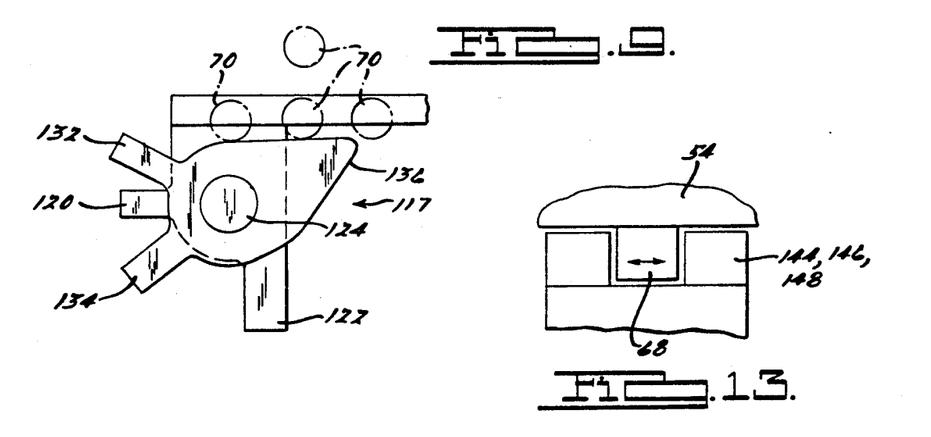
FIG. 13 is a fragmentary cross-sectional view illustrating the operational interconnection of an element of the invention with the FIG. 11 structure.
Figure 14:
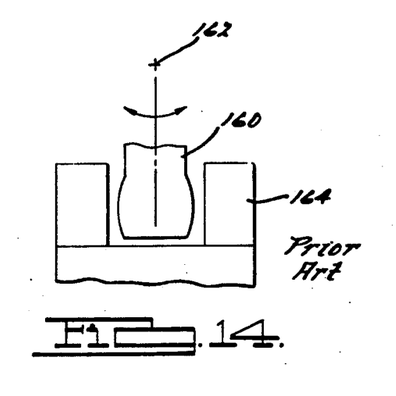
FIG. 14 is a fragmentary cross-sectional view similar to FIG. 13 illustrating the comparable interconnection of a prior art arrangement.

Referring now to FIG. 13 and prior art FIG. 14, it may be noted that the shift finger 68, operating intermediate oppositely disposed legs of the respective shift rail lug members 144, 146 or 148, may be substantially shorter (FIG. 13) than a prior art shift finger 160 (FIG. 14) of a type which is pivoted about a fixed pivot point 162 in an arcuate path to move one or the other of a pair of oppositely disposed taller legs of a shift rail lug member 164. The latter pivotable shift finger 160 must slide upwardly along the surface of an adjacent leg of the shift rail lug member 164 as it pushes same, whereas the shift finger 68 pushes directly against an adjacent leg of one of the shift rail lug members 144, 146 or 148 without any relative movement therebetween.

INDUSTRIAL APPLICABILITY

It should be apparent that the invention provides an improved mechanism for transmission shift control arrangements wherein an operator cannot inadvertently shift from FIFTH gear ratio position into REVERSE, but will automatically be directed toward FOURTH gear ratio position.

It should also be apparent that the invention provides a reverse inhibitor mechanism which may be used with transmission shift control arrangements wherein the selector mechanism is rotatably and slidably mounted on a shaft, with a forward speed ratio shift rail lug and the reverse shift rail lug positioned on the same plane.

While but one embodiment has been shown and described, other modifications thereof are possible within the scope of the following claims.

The embodiments of the invention in which an exclusive property or privilege is claimed are defined as follows:

1. In a transmission shift control apparatus including a two-directional moveable shift control lever, a housing, shift finger means rotatably and slidably mounted in said housing, select and shift shafts mounted through a wall of said housing, first linkage means operatively connected between one end of said select shaft and said shift finger means, second linkage means operatively connected between the inner end of said shift shaft and said shift finger means, and dual push-pull cables operatively interconnected between said shift control lever and the other ends of said respective select and shift shafts for rotating said shift finger means in response to movement of said shift control lever in one direction, and for sliding said shift finger means in response to movement of said shift control lever in the other direction, the improvement comprising a pin formed on a side of said shift finger means, and reverse inhibitor means mounted on a surface of said housing for cooperation with said pin to prevent the inadvertent sliding movement of said shift finger means from said FIFTH gear ratio position into said REVERSE gear ratio position and, instead, to cause said shift finger means to rotate from said FIFTH gear ratio position into said FOURTH gear ratio position.

2. The improvement described in claim 1, wherein said reverse inhibitor means includes a fixed bracket having a straight arm and a bent end arm formed thereon, a shaft mounted through said fixed bracket, a flat member rotatably mounted on said shaft and having first and second radially spaced arms formed thereon and a cam arm formed thereon oppositely disposed from said first arm, and spring means operatively connected among said shaft and said straight arm and said second arm for urging said cam arm into the path of said pin to prevent the movement of said shift finger means into the REVERSE gear ratio position and to divert said shift finger means into said FOURTH gear ratio position.

3. In a transmission shift control apparatus including a shift control lever, a housing, select and shift shafts extending out of said housing, a pair of push-pull cables connected between said shift control lever and the respective said selector and shift shafts for actuating same in response to lateral and longitudinal movement of said shift control lever, a fixed shaft mounted in said housing, a shift member slidably and rotatably mounted on said fixed shaft, a shift finger formed on said shift member, first linkage means operatively connected between the inner end of said selector shaft and said shift member for rotating said shift member on said fixed shaft in response to actuation of said selector shaft by the lateral movement of said shift control lever via one of said cables to position said shift finger in a predetermined radial position around said fixed shaft, and second linkage means operatively connected between one end of said shift shaft and said shift member for sliding said shift member along said fixed shaft in response to actuation of said shift shaft by the longitudinal movement of said shift control lever via the other of said cables to move said shift finger through a plane through said radial position, the improvement comprising a pin formed on a side of said shift members, and reverse inhibitor means mounted on a surface of said housing for cooperation with said pin to prevent the inadvertent sliding movement of said shift finger from said FIFTH gear ratio position into said REVERSE gear ratio position and, instead, to cause said shift finger to rotate from said FIFTH gear ratio position into said FOURTH gear ratio position.

4. The improvement described in claim 3, wherein said reverse inhibitor means includes a fixed bracket having a straight arm and a bent end arm formed thereon, a shaft mounted through said fixed bracket, a flat member rotatably mounted on said shaft and having first and second radially spaced arms formed thereon and a cam arm formed thereon oppositely disposed from said first arm, and spring means operatively connected among said shaft and said straight arm and said second arm for urging said cam arm into the path of said pin to prevent the movement of said shift finger into the REVERSE gear ratio position and to divert said shift finger means into said FOURTH gear ratio position.

5. The improvement described in claim 4, wherein said spring means includes a coiled portion mounted around said shaft, a first bent extension formed on one end of said coiled portion and extended across one side of each of said second arm and said straight arm, and a second bent extension formed on the other end of said coiled portion and extended across the other side of each of said second arm and said straight arm, urging said second arm and said straight arm into side-by-side alignment, whereby said pin moves said cam arm until said first arm is urged against the force of said first bent extension of said spring means into contact with said bent end arm, whereupon continued lateral movement of said shift member causes said pin to move along said cam arm away from said shaft until it clears the end of said cam arm to move into said FOURTH gear ratio position.

* * * * *